(12) United States Patent
Egawa

(10) Patent No.: US 8,759,737 B2
(45) Date of Patent: Jun. 24, 2014

(54) SOLID STATE IMAGING DEVICE WITH A MULTI-RAMP-WAVE GENERATING UNIT

(75) Inventor: Yoshitaka Egawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 393 days.

(21) Appl. No.: 13/176,218

(22) Filed: Jul. 5, 2011

(65) Prior Publication Data
US 2012/0006974 A1 Jan. 12, 2012

(30) Foreign Application Priority Data

Jul. 8, 2010 (JP) .................................. 2010-156075

(51) Int. Cl.
H01L 27/00 (2006.01)
(52) U.S. Cl.
USPC ................... 250/208.1; 250/214 A; 257/431; 348/572
(58) Field of Classification Search
USPC .................. 250/208.1, 214.1, 214 R, 214 A; 257/431; 348/572
See application file for complete search history.

(56) References Cited

U.S. PATENT DOCUMENTS

| 8,537,252 B2 * | 9/2013 | Yoshioka ....................... 348/243 |
| 2009/0021411 A1 * | 1/2009 | Maruyama ...................... 341/155 |
| 2009/0278969 A1 * | 11/2009 | Hisamatsu ....................... 348/308 |

OTHER PUBLICATIONS

Shoji Kawahito, "Column Parallel Analog Signal Processing Techniques for CMOS Image Sensors and Their Applications", The Journal of the Institute of Image Information and Television Engineers, Information Sensing, vol. 30, No. 38, Jul. 2006, pp. 73-78 (with English Abstract).
Yong Lim, et al., "A 1.1e⁻ Temporal Noise ⅓.2-inch 8Mpixel CMOS Image Sensor using Pseudo-Multiple Sampling", IEEE International Solid-State Circuits Conference, Digest of Technical Papers, ISSCC 2010, Session 22, Image Sensors, 22.2, Feb. 10, 2010, pp. 396-398.

* cited by examiner

Primary Examiner — Francis M Legasse, Jr.
(74) Attorney, Agent, or Firm — Oblon, Spivak, McClelland, Maier & Neustadt, L.L.P.

(57) ABSTRACT

According to one embodiment, a solid-state imaging device includes a pixel outputting a photoelectrically converted signal, an ADC circuit disposed in an edge portion of a pixel area to convert an analog signal of the pixel into a digital signal on the basis of a result of comparison between a signal level output from the pixel and a ramp wave which is a reference, and a multi-ramp-wave generating circuit generating a plurality of ramp waves with different amplitudes and combining the plurality of ramp waves to obtain the ramp wave.

18 Claims, 12 Drawing Sheets

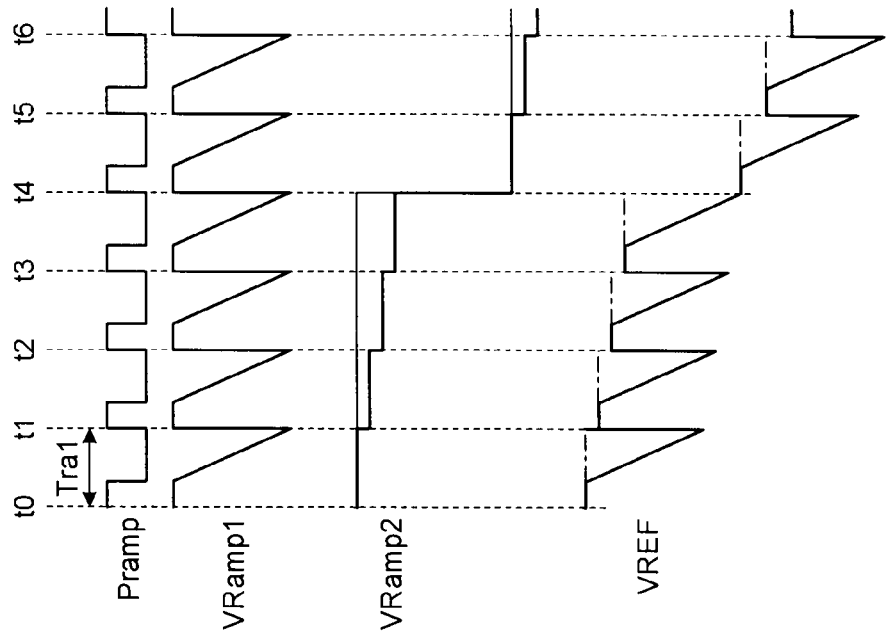
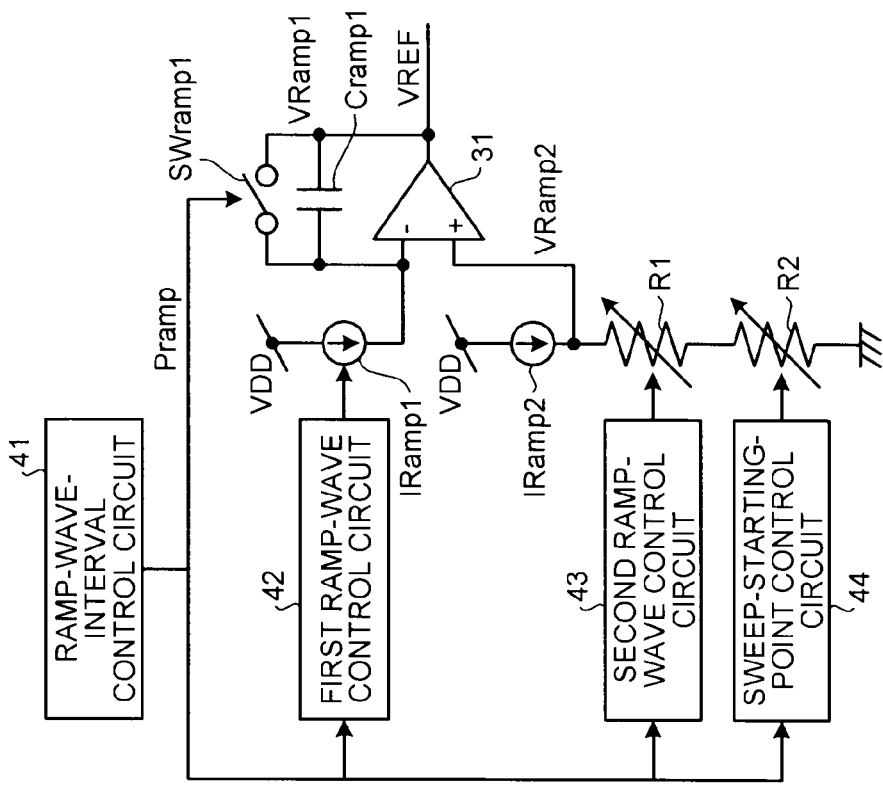

SOLID STATE IMAGING DEVICE WITH A MULTI-RAMP-WAVE GENERATING UNIT

CROSS-REFERENCE TO RELATED APPLICATIONS

This application is based upon and claims the benefit of priority from the prior Japanese Patent Application No. 2010-156075, filed on Jul. 8, 2010; the entire contents of which are incorporated herein by reference.

FIELD

Embodiments disclosed herein relate generally to a solid-state imaging device.

BACKGROUND

In regard to solid-state imaging devices, multiple sampling is proposed to reduce random noise. However, if the multiple sampling is simply applied to correlated double sampling (CDS), the interval of CDS is lengthened and this results in the increase in RTS noise and 1/f noise. Therefore, this method has a small effect in noise reduction, especially, when a signal level is low.

BRIEF DESCRIPTION OF THE DRAWINGS

FIG. 12A is a block diagram illustrating the schematic configuration of a multi-ramp-wave generating circuit; and FIG. 12B is a timing chart illustrating the waveforms of respective units of the solid-state imaging device of FIG. 12A.

DETAILED DESCRIPTION

In general, according to one embodiment, a solid-state imaging device includes a pixel outputting a photoelectrically converted signal, an ADC circuit disposed in an edge portion of a pixel area to convert an analog signal of the pixel into a digital signal on the basis of the result of comparison between the level of the signal output from the pixel and a ramp wave which is a reference voltage, and a multi-ramp-wave generating circuit generating the ramp wave by combining a plurality of ramp waves with different amplitudes.

Exemplary embodiments of a solid-state imaging device will be explained below in detail with reference to the accompanying drawings. The present invention is not limited to the following embodiments.

(First Embodiment)

Figure 1:
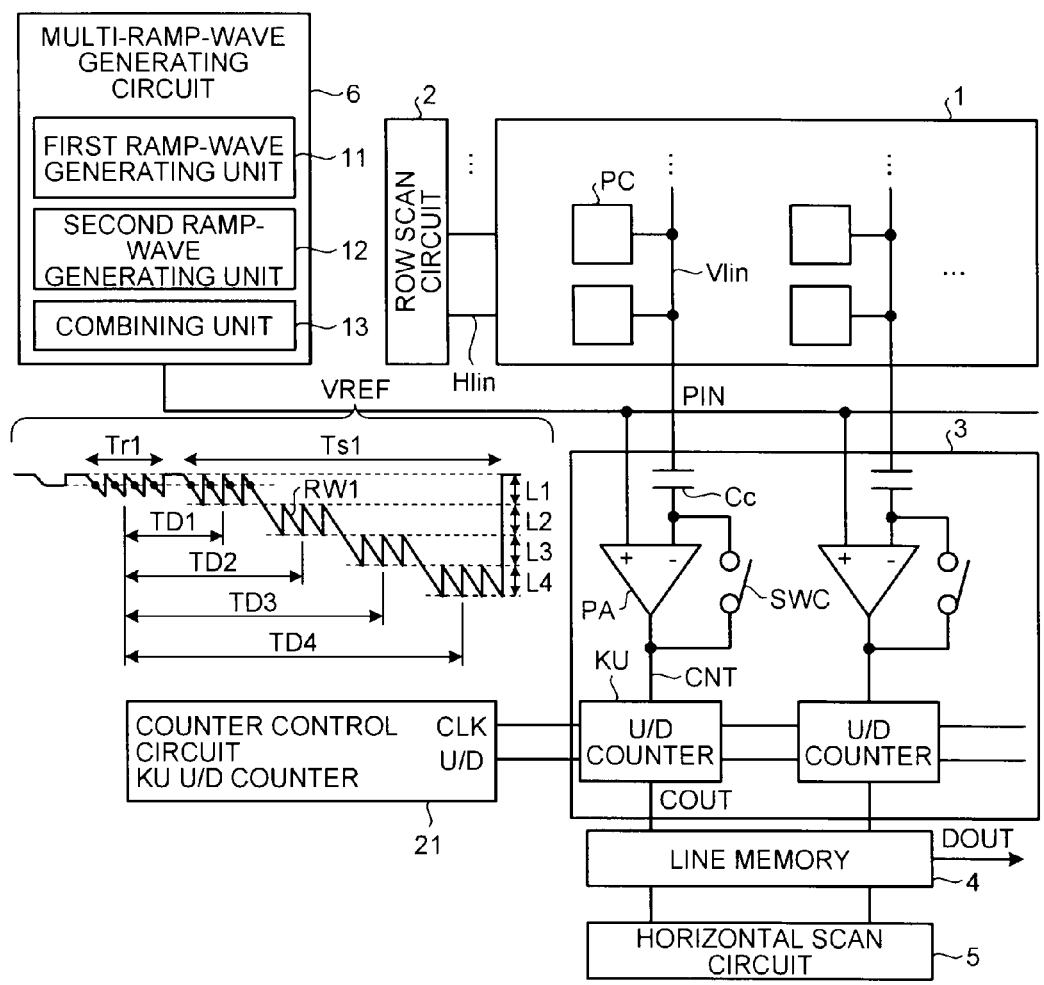
FIG. 1 is a block diagram illustrating the schematic configuration of a solid-state imaging device according to a first embodiment.

FIG. 1 is a block diagram illustrating the schematic configuration of a solid-state imaging device according to a first embodiment.

In FIG. 1, the solid-state imaging device includes a pixel array unit 1 including pixels PC which allows accumulation of photoelectrically converted charge therein and are arranged in a matrix, in a row direction and a column direction, a row scan circuit 2 for scanning pixels PC to be read in a vertical direction, a column ADC circuit 3 for detecting a signal component of each pixel PC through CDS, a line memory 4 for storing signal components of horizontal pixels detected by the column ADC circuit 3, a horizontal scan circuit 5 for performing scanning in a horizontal direction for reading signals stored in the line memory 4, a multi-ramp-wave generating circuit 6 for generating a reference voltage VREF to be compared with a signal level which varies according to the signal output from each pixel PC, and a counter control circuit 21 for controlling a counter.

Here, in the pixel array unit 1, horizontal control lines Hlin are provided in a row direction to control the read from the pixels PC, and vertical signal lines Vlin are provided in a column direction to transmit signals that are read from the pixels PC.

The column ADC circuit 3 includes capacitors Cc, each for storing a reference level of a signal output from each pixel PC, comparators PA, each for comparing the read signal from each pixel PC with the reference voltage VREF, switches SWC for short-circuiting inversion input terminals and output terminals of the comparators PA, and U/D counters KU, each for calculating a difference between the reference level of the CDS and the signal level by performing up-count and down-count on the basis of the comparison results of the comparators PA.

When a signal level which varies according to the signal output from each pixel is compared with the reference voltage VREF, the multi-ramp-wave generating circuit 6 may generate a plurality of ramp waves RW1 for each of levels L1 to L4 while changing the average levels of the ramp waves RW1 in a stepwise fashion, and may sequentially output the plurality of ramp waves RW1 as the reference voltage VREF to the column ADC circuit 3 for each of the levels L1 to L4, from the level L1 in which the signal level is low.

Here, the multi-ramp-wave generating circuit 6 includes a first ramp-wave generating unit 11 for generating a first ramp wave RW1 with a small amplitude, a second ramp-wave generating unit 12 for generating a second ramp wave with a large amplitude, and a combining unit 13 for combining the first ramp wave and the second ramp wave generated with the same timing. The embodiment of FIG. 1 gives an example in which a detection range of the signal detected by the column ADC circuit 3 is divided into four levels L1 to L4 according to the stepwise second ramp wave generated.

The detection range of the column ADC circuit 3 may be designed to correspond to, for example, signal levels from a minimum signal input level to a maximum signal input level of the column ADC circuit 3. For example, if the detection range of the column ADC circuit 3 includes 1024 digital values of 0 to 1023, the level L1 may be set to a range of digital values of 0 to 255, the level L2 may be set to a range of digital values of 256 to 511, the level L3 can be set to a range of digital values of 512 to 767, and the level L4 can be set to a range of digital values of 768 to 1023.

In a case of dividing the detection range of the column ADC circuit 3, the detection range is not necessarily divided equally. For example, in order to reduce a CDS interval TD1 when the signal level is low, the divided signal level range of the level L1 may be narrower than that of the divided signal level ranges of the levels L2 to L4.

The row scan circuit 2 scans the pixels PC in a vertical direction to select pixels PC in a row direction, and transmits signals read from the pixels PC to the column ADC circuit 3 through the vertical signal lines Vlin.

Meanwhile, in a detection period Tr1 of the reference signal levels output from the pixels PC, the first ramp-wave generating unit 11 of the multi-ramp-wave generating circuit 6 generates the plurality of ramp waves RW1, and sequentially inputs the ramp waves RW1 to non-inversion input terminals of the comparators PA. Further, in a detection period Ts1 of the signal levels, the second ramp-wave generating unit 12 of the multi-ramp-wave generating circuit 6 generates a plurality of ramp waves RW1 for each of the levels L1 to L4, and sequentially inputs the ramp waves RW1 to the non-inversion input terminals of the comparators PA.

Also, in the column ADC circuit 3, the reference level is multiply-sampled from the signal of each pixel PC, and at the same time, the signal level is multiply-sampled for the levels L1 to L4, according to the signal level from the signal of each pixel PC. Then, a difference between the multiply-sampled signal level and the multiply-sampled reference level is obtained to detect the signal component of each pixel PC through the CDS.

Here, for multiple sampling, the U/D counter KU repeatedly performs a down-count operation until the reference level signal from each pixel PC reaches the level of the reference voltage VREF. Next, similarly, the U/D counter KU repeatedly performs an up-count operation until the signal level from each pixel PC reaches the level of the reference voltage VREF. As a result, the signal component detected through the CDS is converted into a digital value COUT, and the digital values COUT of the horizontal pixels are stored in the line memory 4.

Further, in a case where the signal level of the signal read from each pixel PC is in the level L1, an average CDS interval is TD1, and in a case where the signal level of the signal read from each pixel PC is in the level L2, the average CDS interval is TD2. Also, in a case where the signal level of the signal read from each pixel PC is in the level L3, the average CDS interval is TD3, and in a case where the signal level of the signal read from each pixel PC is in the level L4, the average CDS interval is TD4.

Therefore, it is possible to set the CDS interval TD1 for the case that the signal level of the signal read from each pixel PC is low to be shorter than the CDS interval TD4 for the case that the signal level of the signal read from each pixel PC is high. For this reason, it is possible to suppress the increase in RTS noise and 1/f noise in the low signal level while reducing random noise by multiple sampling.

Although a method of changing the average level of the ramp wave RW1 in N (=4) levels, from level L1 to level L4, has been described in the example of FIG. 1. However, the number of levels may not be limited thereto as long as N is an integer of two or more. Further, in regard to the example of FIG. 1, although described is a method in which the multiple sampling is performed a given number (M) of times (for example, four times) for each of levels L1 to L4, as long as M is an integer of two or more, the number of times of the multiple sampling is not limited thereto. Furthermore, the numbers of times of multiple sampling for the respective levels L1 to L4 may differ from each other. Especially, the number of times of multiple sampling for the level in which the signal level is high may be smaller than the number of times of multiple sampling for the level in which the signal level is low. An amplifier circuit may be provided to amplify a higher signal level by a decrease of the number of times of multiple sampling.

Also, in the above embodiment, although described is a method of directly inputting the signals read from the pixels PC to the column ADC circuit 3, a column amplifier circuit may be provided between the pixel array unit 1 and the column ADC circuit 3 to amplify signals read from pixels PC of each column and input the amplified signals to the column ADC circuit 3.

FIGS. 2A to 2D are circuit diagrams illustrating exemplary configurations of a pixel PC of the solid-state imaging device of FIG. 1.

Figure 2A:
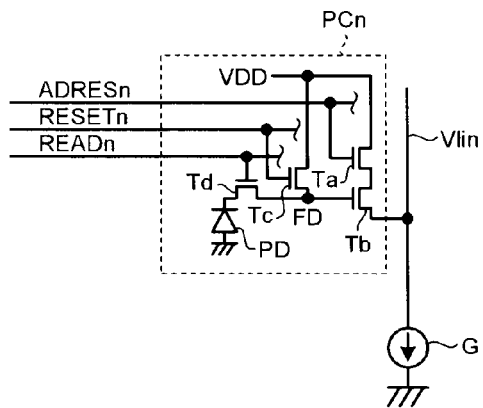
FIGS. 2A to 2D are circuitry diagrams illustrating exemplary configurations of a pixel PC of the solid-state imaging device of FIG. 1.

In FIG. 2A, a pixel PCn includes a photodiode PD, a row selection transistor Ta, an amplifying transistor Tb, a reset transistor Tc, and a read transistor Td. At the connection point of the amplifying transistor Tb, the reset transistor Tc, and the read transistor Td; floating diffusion FD is formed.

Also, a source of the read transistor Td is connected to the photodiode PD, and a gate of the read transistor Td receives a read signal READn. Further, a source of the reset transistor Tc is connected to a drain of the read transistor Td, a gate of the reset transistor Tc receives a reset signal RESETn, and a drain of the reset transistor Tc is connected to a power source potential VDD. Furthermore, a gate of the row selection transistor Ta receives a row selection signal ADRESn, and a drain of the row selection transistor Ta is connected to the power source potential VDD. Moreover, a source of the amplifying transistor Tb is connected to a vertical signal line Vlin, a gate of the amplifying transistor Tb is connected to the drain of the read transistor Td, and a drain of the amplifying transistor Tb is connected to a source of the row selection transistor Ta. Also, a current source G is connected to the vertical signal line Vlin.

Further, a horizontal control line Hlin of FIG. 1 can transmit the read signal READn, the reset signal RESETn, and the row selection signal ADRESn to pixels of the corresponding row.

Figure 2B:
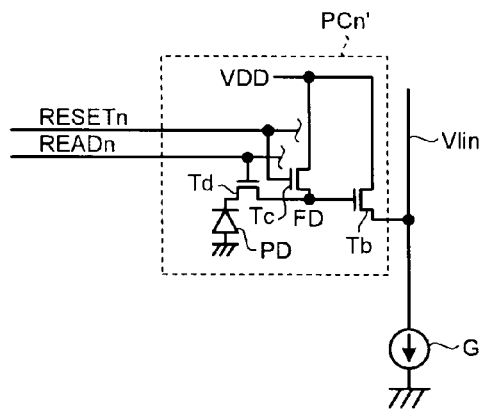

In FIG. 2B, a pixel PCn' has the same configuration as the pixel PCn of FIG. 2A except that the row selection transistor Ta is omitted. Further, the pixel PCn' is configured to be capable of switching between the power source potential VDD and a ground potential.

In a non-selected row, the potential of the floating diffusion FD is set to the ground potential through the reset transistor Tc so as to turn off the amplifying transistor Tb. Meanwhile, in a selected row, the potential of the floating diffusion FD is set to the power source potential VDD through the reset transistor Tc so as to turn on the amplifying transistor Tb.

Figure 2C:
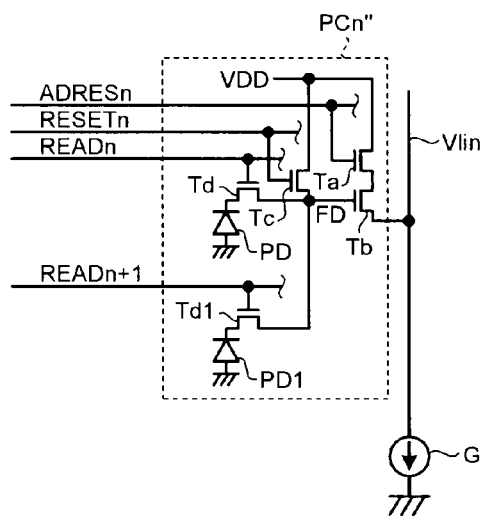

In FIG. 2C, a pixel PCn" has the same configuration as the pixel PCn except that a read transistor Td1 and a photodiode PD1 are added and one amplifying transistor Tb is common to the photodiodes PD of two pixels.

Figure 2D:
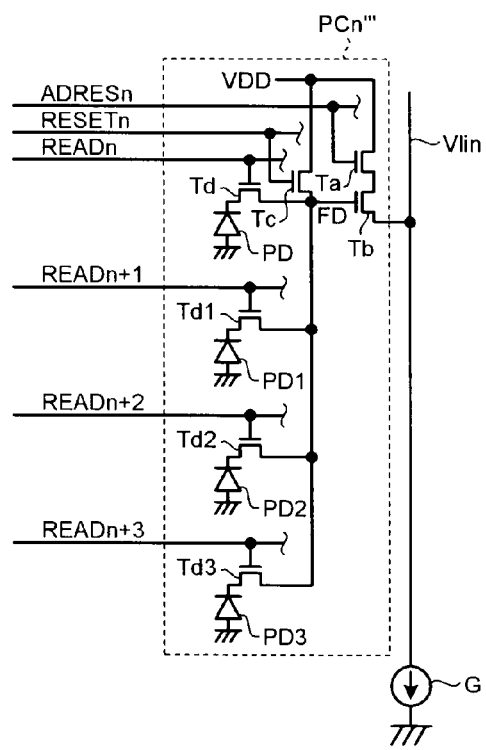

In FIG. 2D, a pixel PCn''' has the same configuration as the pixel PCn except that read transistors Td1 to Td3 and photodiodes PD1 to PD3 are added and one amplifying transistor Tb is common to the photodiodes PD of 4 pixels.

Figure 3:
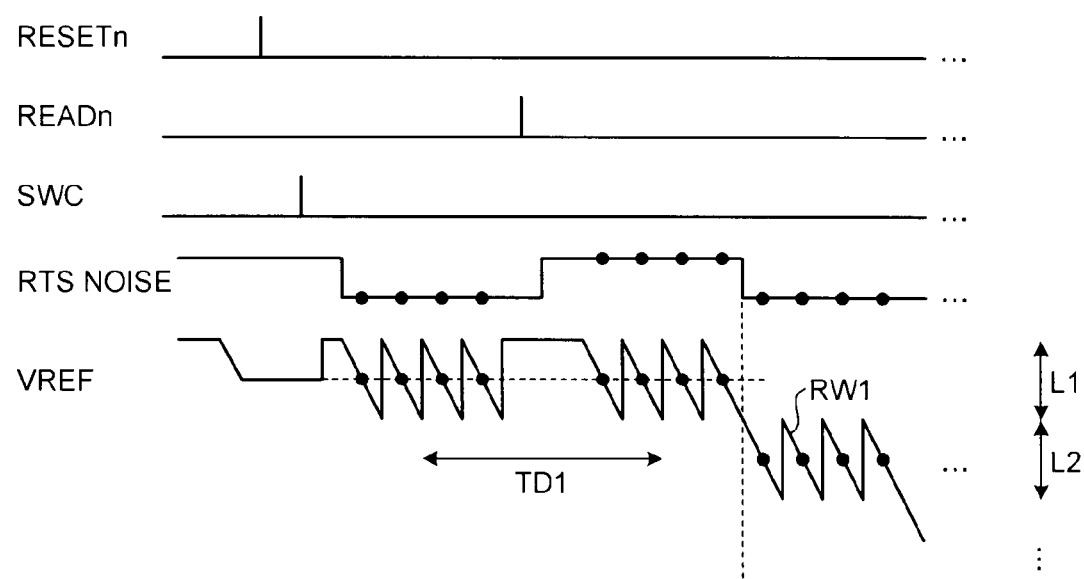
FIG. 3 is a timing chart illustrating the waveforms of respective units of the solid-state imaging device of FIG. 1.

FIG. 3 is a timing chart illustrating the waveforms of respective units of the solid-state imaging device of FIG. 1. In the following description, a case of using the pixel PCn of FIG. 2A as the pixel PC is given as an example.

In FIG. 3, in a case where the row selection signal ADRESn has a low level, the row selection transistor Ta is in an OFF state and does not perform a source follower operation, so that any signal is not output to the vertical signal line Vlin. At this time, if the read signal READn and the reset signal RESETn transition to a high level, the read transistor Td is turned on so that electric charge accumulated in the photodiode PD is discharged to the floating diffusion FD. Then, the electric charge is discharged to a power supply VDD through the reset transistor Tc.

After the electric charge accumulated in the photodiode PD is discharged to the power supply VDD, if the read signal READn transitions to a low level, effective signal electric-charge starts to be accumulated in the photodiode PD.

Next, if the row selection signal ADRESn transitions to a high level, the row selection transistor Ta of the pixel PC is turned on so that the power source potential VDD is applied to the drain of the amplifying transistor Tb. As a result, a source follower circuit is configured by the amplifying transistor Tb and a constant-current transistor (constant current source G).

Then, if the reset signal RESETn transitions to a high level in a state in which the row selection signal ADRESn is in an ON state, the reset transistor Tc is turned on so that the extra electric charge generated in the floating diffusion FD by a leakage current, etc., is reset. Therefore, a voltage according to a reference level of the floating diffusion FD is applied to the gate of the amplifying transistor Tb. Here, since the source follower circuit is configured by the amplifying transistor Tb and the constant-current transistor (constant current source G), the voltage of the vertical signal line Vlin follows the voltage applied to the gate of the amplifying transistor Tb and thus the voltage applied to the gate of the amplifying transistor Tb is output to the vertical signal line Vlin as an output voltage PIN having the reference level.

Here, since a switch SWC is turned on when the reference level of the signal read from the pixel PC is output, an input voltage of the non-inversion input terminal of the comparator PA is clamped by the output voltage such that an operation point is set.

Next, after the switch SWC is turned off, in the reference level detection period Tr1, the reference level of output voltage PIN is input to the comparator PA through the capacitor Cc, and in this state, the ramp wave RW1 is repeatedly applied as the reference voltage VREF, so that the reference level of output voltage PIN and the reference voltage VREF are repeatedly compared with each other.

Then, in a case where the reference level of output voltage PIN is lower than the level of the reference voltage VREF, an output voltage CNT of the comparator PA has a high level. If the reference level of output voltage PIN for each ramp wave RW1 is equal to the level of the reference voltage VREF, the output voltage CNT has a low level. The length of the high level period is repeatedly down-counted by the U/D counter KU so that the reference level of output voltage PIN multiply-sampled is converted into the digital value COUT, and the digital value COUT is stored in the U/D counter KU. For example, in a case where the reference level is sampled four times, it is possible to integrate down-count values of the reference level corresponding to four times by repeating down-count, corresponding to a first sampling of the reference level, four times.

Next, if the read signal READn transitions to the high level in a state in which the row selection transistor Ta of the pixel PCn is in the ON state, the read transistor Td is turned on so that the electric charge accumulated in the photodiode PD is transmitted to the floating diffusion FD. Therefore, the voltage according to the signal level of the floating diffusion FD is applied to the gate of the amplifying transistor Tb. Here, since the source follower circuit is configured by the amplifying transistor Tb and the constant current source G, the voltage of the vertical signal line Vlin follows the voltage applied to the gate of the amplifying transistor Tb and thus the voltage applied to the gate of the amplifying transistor Tb is output to the vertical signal line Vlin as a signal level of output voltage PIN.

Then, the signal level of output voltage PIN is input to the comparator PA through the capacitor Cc, and in this state, the ramp wave RW1 is repeatedly applied as the reference voltage VREF for each of the levels L1 to L3, such that the signal level of output voltage PIN and the reference voltage VREF are repeatedly compared with each other.

In a case where the signal level of output voltage PIN is lower than the level of the reference voltage VREF, the output voltage CNT of the comparator PA has the high level, and if the signal level of output voltage PIN is equal to the level of the reference voltage VREF, the output voltage CNT has the low level. The length of the high level period is repeatedly up-counted this time by the U/D counter KU so that the difference between the signal level of output voltage PIN multiply-sampled and the reference level of output voltage PIN is converted into a digital value COUT, and the digital values of horizontal pixels are stored in the line memory 4. For example, in a case where the signal level is sampled only four times, it is possible to integrate the up-count values of signal levels corresponding to four times by repeating the up-count four times for a single sampling of the signal level. Then, the digital values COUT stored in the line memory 4 are output as output data DOUT.

Therefore, it is possible to narrow the CDS interval TD1 for the case in which the signal level of the signal read from each pixel PC is low as compared with the CDS interval TD4 for the case in which the signal level of the signal read from each pixel PC is high. Also, it is possible to suppress an increase in RTS noise and 1/f noise in a low signal level with the random noise reduced by multiple sampling.

(Second Embodiment)

Figure 4:
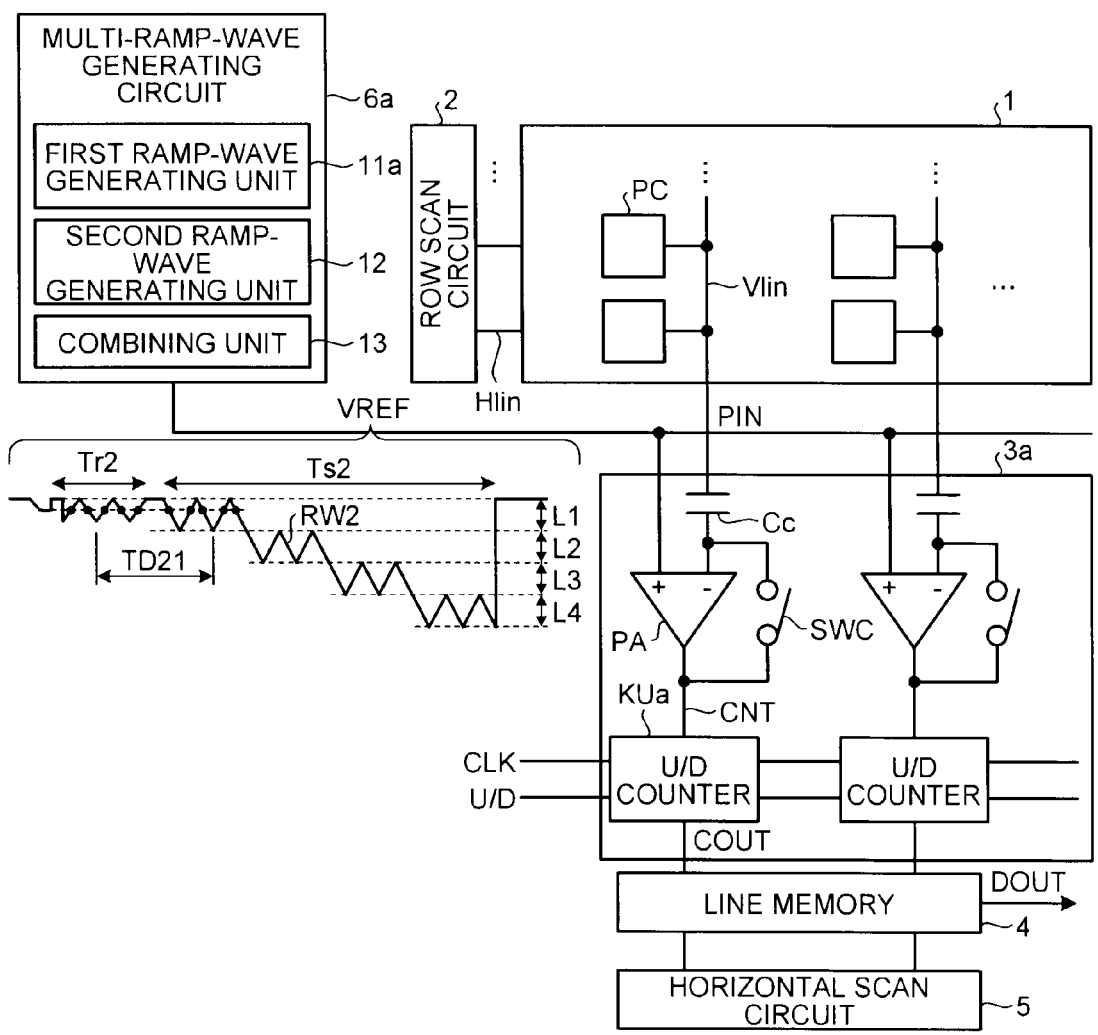
FIG. 4 is a block diagram illustrating the schematic configuration of a solid-state imaging device according to a second embodiment.

FIG. 4 is a block diagram illustrating the schematic configuration of a solid-state imaging device according to a second embodiment.

In FIG. 4, the solid-state imaging device includes a column ADC circuit 3a and a multi-ramp-wave generating circuit 6a, instead of the column ADC circuit 3 and the multi-ramp-wave generating circuit 6 of FIG. 1.

The multi-ramp-wave generating circuit 6a includes a first ramp-wave generating unit 11a, instead of the first ramp-wave generating unit 11 of FIG. 1. The first ramp-wave generating unit 11a can generate a plurality of ramp waves RW2. Here, the ramp waves RW2 have upward slopes and downward slopes.

The column ADC circuit 3a includes a U/D counter KUa for each column, instead of the U/D counter KU of FIG. 1. The U/D counter KUa can perform a count operation to sample the reference level or a count operation to sample the signal level at both sides of the upward slope and the downward slope of the ramp wave RW2.

Further, the row scan circuit 2 scans the pixels PC in the vertical direction so as to select pixels PC in a row direction, and transmits the signals read from the pixels PC to the column ADC circuits 3a through the vertical signal lines Vlin.

Meanwhile, in a reference level detection period Tr2, the plurality of ramp waves RW2 are generated by the first ramp-wave generating unit 11a of the multi-ramp-wave generating circuit 6a and are sequentially input to the non-inversion input terminal of the comparator PA. Also, in a signal level detection period Ts2, the plurality of ramp waves RW2 are generated for each of the levels L1 to L4 by the second ramp-wave generating unit 12 of the multi-ramp-wave generating circuit 6a, and are sequentially input to the non-inversion input terminal of the comparator PA.

Further, the column ADC circuit 3a multiply-samples the reference level from the signal of each pixel PC, and at the same time, multiply-samples the signal level for the level L1, L2, L3, or L4 according to the signal level from each pixel PC. Then, the difference between the multiply-sampled signal level and the multiply-sampled reference level is obtained so as to detect the signal component of each pixel PC through the CDS.

Here, in the U/D counter KUa, a down-count operation is repeatedly performed until the reference level multiply-sampled from the signal of each pixel PC reaches the level of the reference voltage VREF on each of the upward slope side and the downward slope side, and then an up-count operation is repeatedly performed until the reference level multiply-sampled from the signal of each pixel PC reaches the level of the reference voltage VREF on each of the upward slope side and the downward slope side, so that the signal component detected by the CDS is converted into a digital value COUT, and digital values COUT of horizontal pixels are stored in the line memory 4.

Here, sampling is performed by using both sides of the upward slope and the downward slope of the reference voltage VREF. Therefore, it is possible to shorten the CDS interval TD21 for the case in which the signal level of the signal read from each pixel PC is low as compared to the method of FIG. 1. Also, it is possible to further suppress an increase in RTS noise and 1/f noise in the low signal level while reducing the random noise by multiple sampling.

Figure 5:
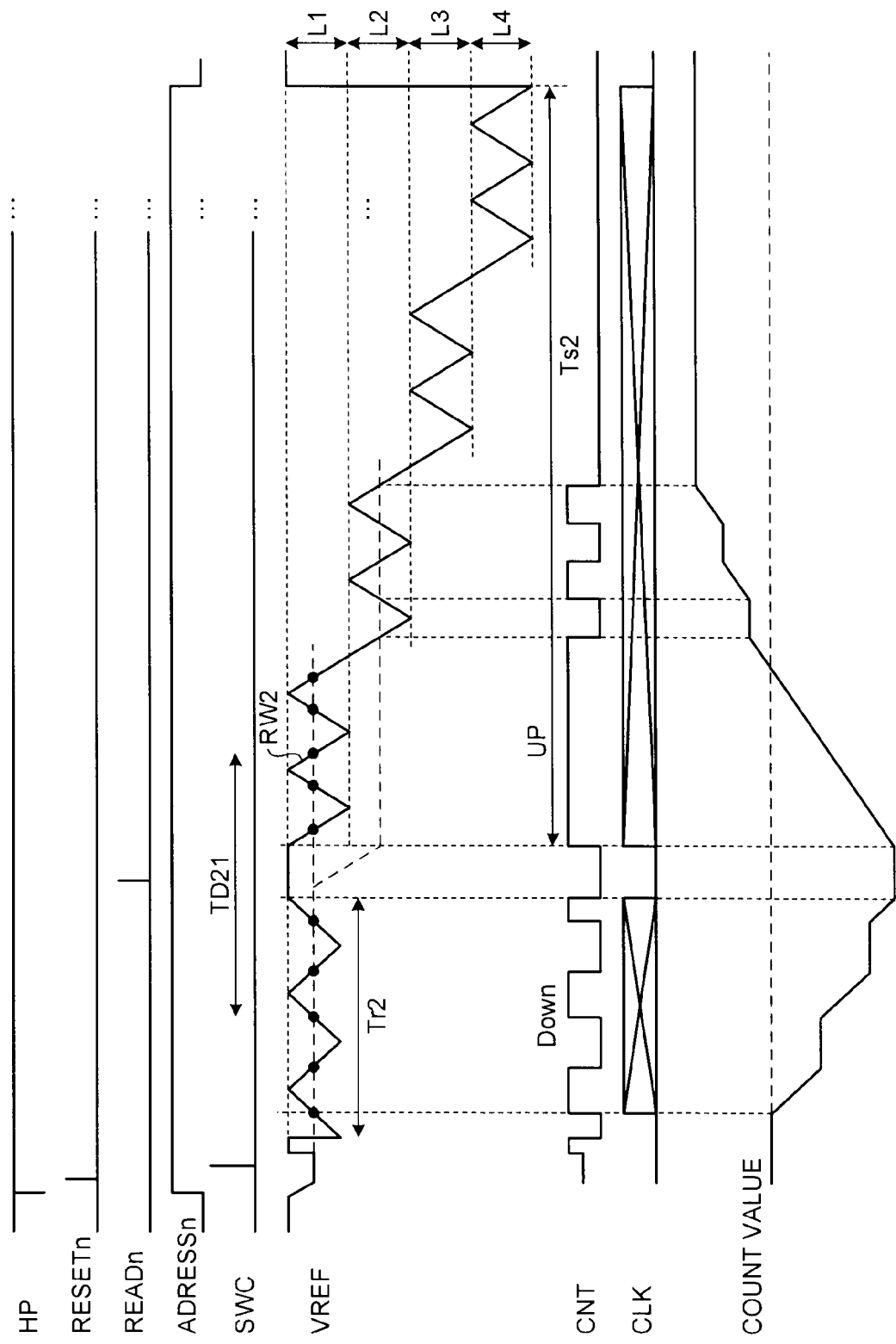
FIG. 5 is a timing chart illustrating the waveforms of respective units of the solid-state imaging device of FIG. 4.

FIG. 5 is a timing chart illustrating the waveforms of individual units of the solid-state imaging device of FIG. 4.

In FIG. 5, if the reset signal RESETn transitions to the high level in a state in which the row selection transistor Ta is in the OFF state, the reset transistor Tc is turned on, so that the voltage according to the reference level of the floating diffusion FD is applied to the gate of the amplifying transistor Tb. Therefore, the voltage of the vertical signal line Vlin follows the voltage applied to the gate of the amplifying transistor Tb and thus the voltage applied to the gate of the amplifying transistor Tb is output to the vertical signal line Vlin as the reference level of output voltage PIN.

Here, since a switch SWC is turned on when the reference level of the signal from the pixel PC is output, an input voltage of the non-inversion input terminal of the comparator PA is clamped by the output voltage so that an operation point is set.

Next, after the switch SWC is turned off, in the reference level detection period Tr21, the reference level of output voltage PIN is input to the comparator PA through the capacitor Cc, and in this state, the ramp wave RW21 is repeatedly applied as the reference voltage VREF, such that the reference level of output voltage PIN and the reference voltage VREF are repeatedly compared with each other.

Then, if the level of the reference voltage VREF is higher than the reference level of output voltage PIN, the count operation stops. Meanwhile, if the level of the reference voltage VREF is lower than the reference level of output voltage PIN, the down-count operation is repeated by the U/D counter KUa such that the reference level of output voltage PIN multiply-sampled is converted into a digital value COUT, which is stored in the U/D counter KUa.

Next, if the read signal READn transitions to the high level in the state in which the row selection transistor Ta of the pixel PCn is in the ON state, the read transistor Td is turned on, such that the electric charge accumulated in the photodiode PD is transmitted to the floating diffusion FD. Therefore, the voltage according to the signal level of the floating diffusion FD is applied to the gate of the amplifying transistor Tb and thus is output as the signal level of output voltage PIN to the vertical signal line Vlin.

Next, the signal level of output voltage PIN is input to the comparator PA through the capacitor Cc, and in this state, the ramp wave RW2 is repeatedly applied to the reference voltage VREF for each of the levels L1 to L4, such that the signal level of output voltage PIN and the reference voltage VREF are repeatedly compared with each other.

If the level of the reference voltage VREF is higher than the signal level of output voltage PIN, the count operation stops. Meanwhile, if the level of the reference voltage VREF is lower than the signal level of output voltage PIN, the up-count operation is repeated this time by the U/D counter KUa such that the difference between the signal level of output voltage PIN multiply-sampled and the reference level of output voltage PIN is converted into a digital value COUT, and digital values of the horizontal pixels are stored in the line memory 4.

Therefore, it is possible to shorten the CDS interval TD21 for the case in which the signal level of the signal read from each pixel PC is low. Also, it is possible to suppress an increase in RTS noise and 1/f noise in a low signal level with the random noise reduced by multiple sampling. Further, in the case of five times of sampling, it is possible to reduce the random noise to $1/\sqrt{5} (=1/2.23)$.

(Third Embodiment)

Figure 6:
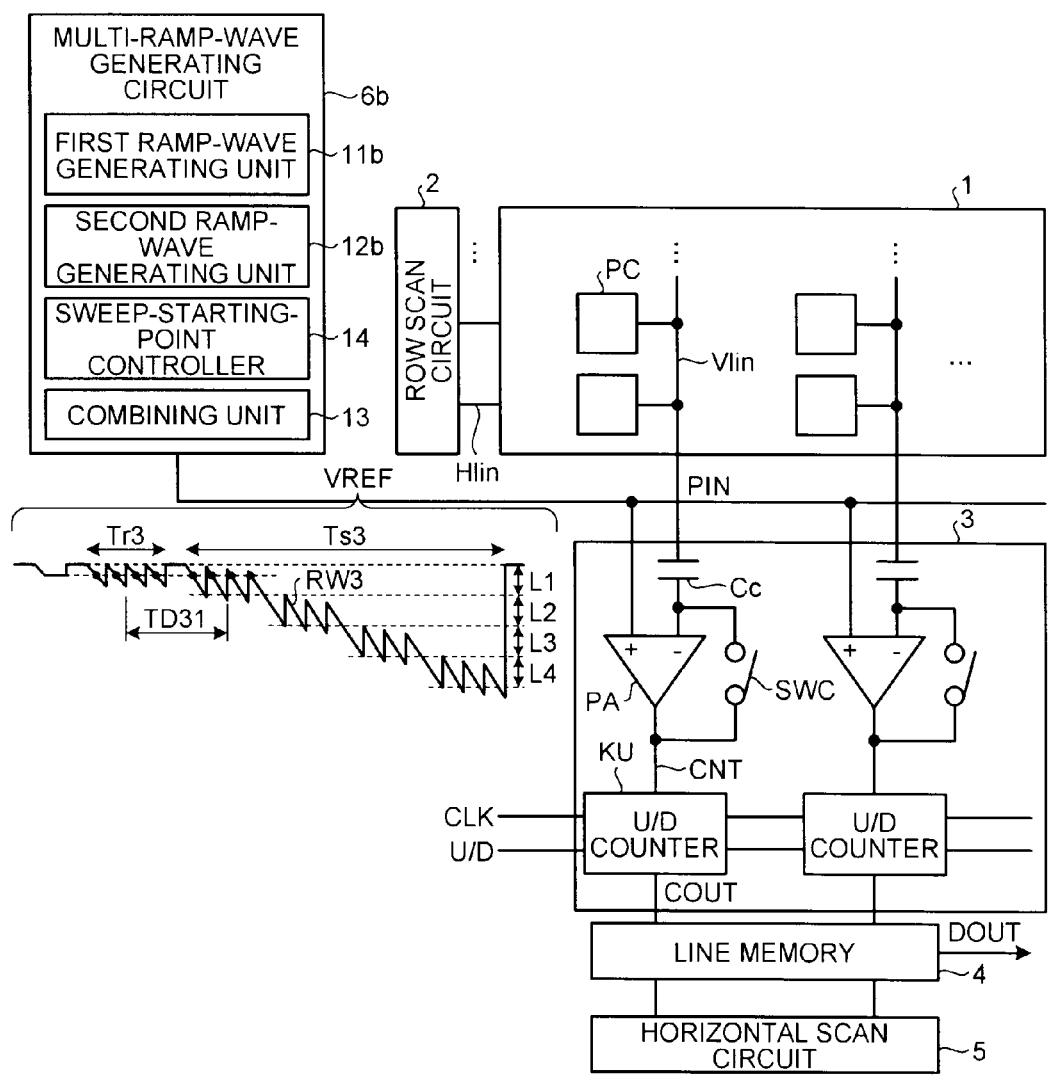
FIG. 6 is a block diagram illustrating the schematic configuration of a solid-state imaging device according to a third embodiment.

FIG. 6 is a block diagram illustrating the schematic configuration of a solid-state imaging device according to a third embodiment.

In FIG. 6, the solid-state imaging device includes a multi-ramp-wave generating circuit 6b, instead of the multi-ramp-wave generating circuit 6 of FIG. 1.

The multi-ramp-wave generating circuit 6b includes a first ramp-wave generating unit 11b and a sweep-starting-point controller 14, instead of the first ramp-wave generating unit 11 of the multi-ramp-wave generating circuit 6 of FIG. 1.

The first ramp-wave generating unit 11b can set inclinations of ramp waves RW3 in such a manner that the resolution capability of AD conversion of the column ADC circuit 3 is coarser than the limit thereof. The sweep-starting-point controller 14 can make sweep starting points of the individual ramp waves RW3 in the individual levels L1 to L4 differ from each other.

Further, it is preferable to make the sweep starting points of the ramp waves RW3 of the individual levels L1 to L4 differ from each other so that the resolution capability becomes finer than the resolution capability of the AD conversion set by the first ramp-wave generating unit 11b.

Also, the row scan circuit 2 scans the pixels PC in the vertical direction so as to select pixels PC in a row direction, and the signals read from the pixels PC are transmitted to the column ADC circuits 3 through the vertical signal line Vlin.

Meanwhile, in a reference level detection period Tr3, the multi-ramp-wave generating circuit 6b generates the plurality of ramp waves RW3 in such a manner that the sweep starting points of the individual levels L1 to L4 are different from each other, and sequentially inputs the plurality of ramp waves RW3 to the non-inversion input terminal of the comparator PA. Also, in a signal level detection period Ts3, the first ramp-wave generating unit 11b or the second ramp-wave generating unit 12b of the multi-ramp-wave generating circuit 6b generates the plurality of ramp waves RW3 for the individual levels L1 to L4 such that the sweep starting points of the individual levels L1 to L4 are different from each other, and sequentially inputs the plurality of ramp waves RW3 to the non-inversion input terminal of the comparator PA.

Next, the column ADC circuit 3 multiply-samples the reference level from the signals of the individual pixels PC, and at the same time, multiply-samples the signal level for the levels L1 to L4 according to the signal levels from the signals of the individual pixels Pc. Then, the difference between the multiply-sampled signal level and the multiply-sampled reference level is obtained so as to detect the signal component of each pixel PC by the CDS.

Here, the inclinations of the ramp waves RW3 are set in such a manner that the resolution capability of the AD conversion of the column ADC circuit 3 is coarser than the limit thereof. Therefore, it is possible to increase the inclinations of the ramp waves RW3 (to reduce the number of steps), and to reduce the speed of the AD conversion process of the column ADC circuit 3.

Further, it is possible to make sampling positions in the individual ramp waves RW3 differ from each other with respect to the same signal level by making the sweep starting points of the ramp waves RW3 of the individual levels L1 to L4 differ from each other. Therefore, in a case where the inclinations of the ramp waves RW3 are set in such a manner that the resolution capability of the AD conversion of the column ADC circuit 3 is rougher than the limit thereof, it is possible to suppress degradation in resolution capability when the signal level is detected.

Figure 7:
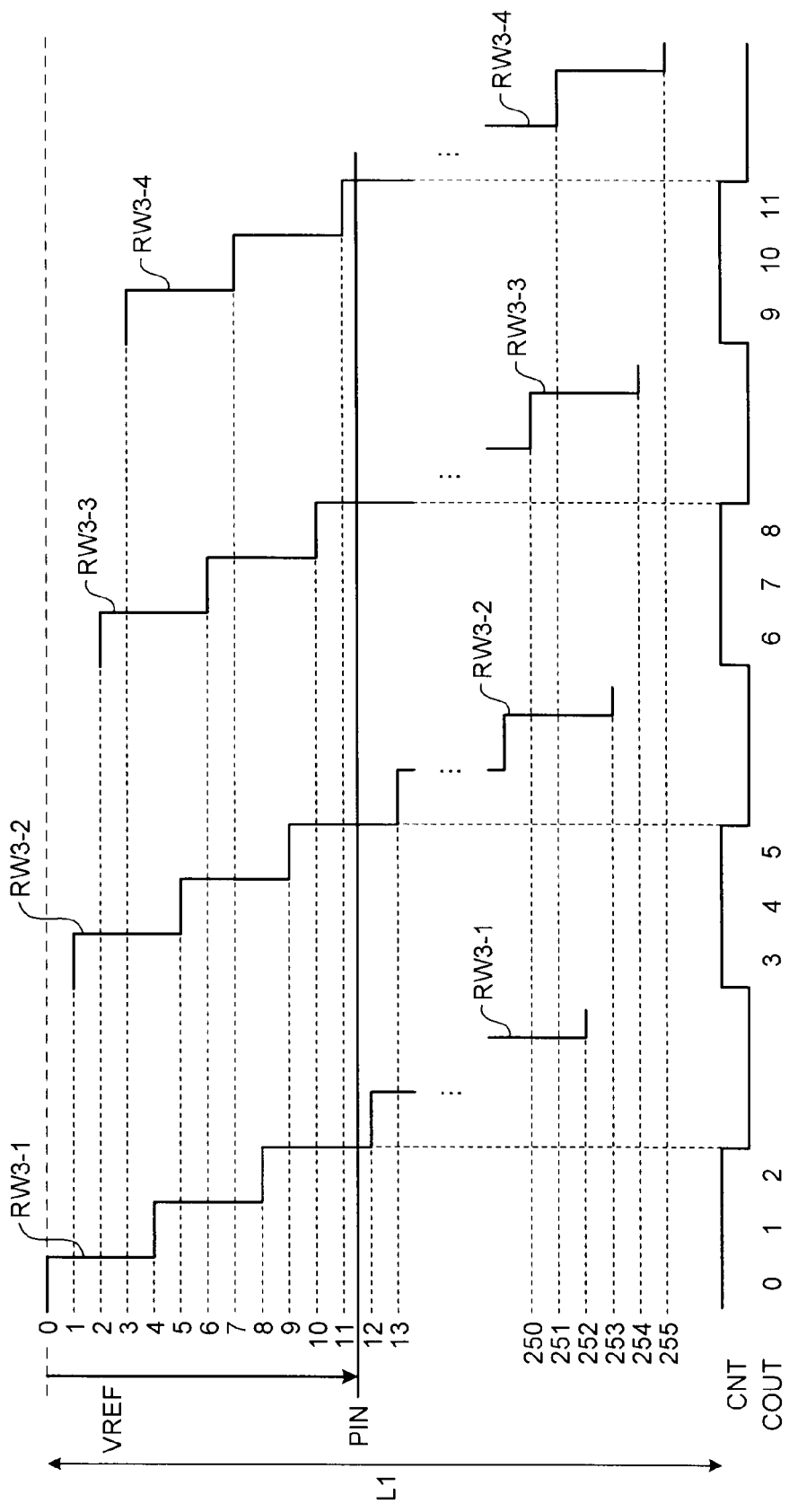
FIG. 7 is an enlarged view of a portion of a waveform of a reference voltage VREF generated in a reference voltage generating circuit 6b of FIG. 6.

FIG. 7 is an enlarged view of a portion of a waveform of a reference voltage VREF generated in the multi-ramp-wave generating circuit 6b of FIG. 6.

In FIG. 7, for example, the level L1 is set to a range of digital values from 0 to 255, and four ramp waves RW3-1, RW3-2, RW3-3, and RW3-4 are generated as the ramp wave RW3 of the level L1.

Further, each step of each of the ramp waves RW3-1, RW3-2, RW3-3, and RW3-4 is set to correspond to four digital values, and correspond to ¼ of the resolution capability of the AD conversion of the column ADC circuit 3. In this case, the inclination of each of the ramp waves RW3-1, RW3-2, RW3-3, and RW3-4 becomes 4 times, and the speed of the AD conversion of the column ADC circuit 3 becomes 4 times.

Further, the sweep starting point of the ramp wave RW3-1 is set to a digital value of 0, and the sweep range of the ramp wave RW3-1 is set to a range of digital values of 0 to 252. The sweep starting point of the ramp wave RW3-2 is set to a digital value of 1, and the sweep range of the ramp wave RW3-2 is set to a range of digital values of 1 to 253. The sweep starting point of the ramp wave RW3-3 is set to a digital value of 2, and the sweep range of the ramp wave RW3-3 is set to a range of digital values of 2 to 254. The sweep starting point of the ramp wave RW3-4 is set to a digital value of 3, and the sweep range of the ramp wave RW3-4 is set to a range of digital values of 4 to 255.

Furthermore, for example, under the assumption that the signal level of output voltage PIN is between digital values of 11 and 12, each of the signal levels detected with the ramp waves RW3-1, RW3-2, RW3-3, and RW3-4 is between digital values of 8 and 12.

Here, the ramp wave RW3-2 has the sweep starting point deviating with respect to the ramp wave RW3-1 by a digital value of 1. Accordingly, when the signal level is assumed to be between digital values 8 and 9, the signal level detected with the ramp wave RW3-2 should be between digital values of 4 and 8. However, since the actual signal level is between digital values of 8 and 12, it is found that the signal level is not between digital values of 8 and 9.

Further, the ramp wave RW3-3 has the sweep starting point deviating with respect to the ramp wave RW3-1 by a digital value of 2. Accordingly, under the assumption that the signal level is between digital values 9 and 10, the signal level detected with the ramp wave RW3-3 should be between digital values of 4 and 8. However, since the actual signal level is between digital values of 8 and 12, it is found that the signal level is not between digital values of 9 and 10.

Furthermore, the ramp wave RW3-4 has the sweep starting point deviating with respect to the ramp wave RW1 by a digital value of 3. Accordingly under the assumption that the signal level is between digital values 10 to 11, the signal level detected by the ramp wave RW3-4 should be between digital values of 4 to 8. However, since the actual signal level is between digital values of 8 to 12, it is found that the signal level is not between digital values of 10 to 11.

Finally, despite the fact that the signal levels detected with the ramp waves RW3-1, RW3-2, RW3-3, and RW3-4 are between the digital values of 8 and 12, since it is found that the signal levels are not between the digital values of 8 and 11, it is found that the signal level is between the digital values of 11 and 12.

Therefore, even in a case where the inclinations of the ramp waves RW3 are large, it is possible to suppress the degradation in the resolution capability of the signal levels. Also, it is possible to increase the speed of the AD conversion process of the column ADC circuit 3 while suppressing the degradation in the image quality.

(Fourth Embodiment)

Figure 8:
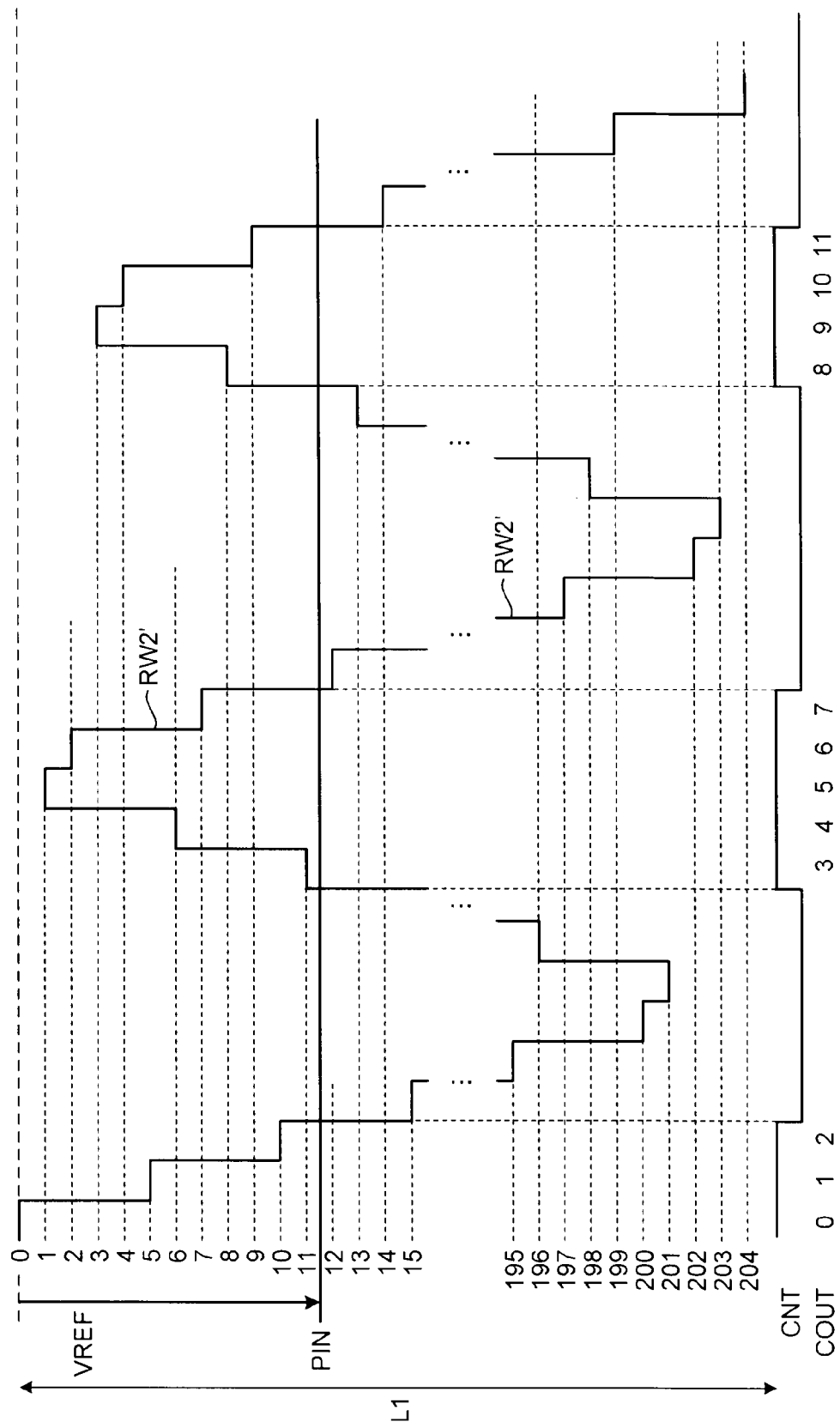
FIG. 8 is an enlarged view illustrating a portion of the waveform of the reference voltage VREF of a solid-state imaging device according to a fourth embodiment.

FIG. 8 is an enlarged view illustrating a portion of a waveform of a reference voltage VREF of a solid-state imaging device according to a fourth embodiment.

In FIG. 8, even in a case of performing sampling by using an upward slope and a downward slope of the ramp wave RW2 of FIG. 4, it is possible to speed up the AD conversion process of the column ADC circuit 3a while suppressing the reduction in the resolution capability of the signal levels, by generating ramp waves RW2' having an inclination larger than that of the ramp wave RW2 and making sweep starting points of the ramp waves RW2' differ from each other.

(Fifth Embodiment)

Figure 9:
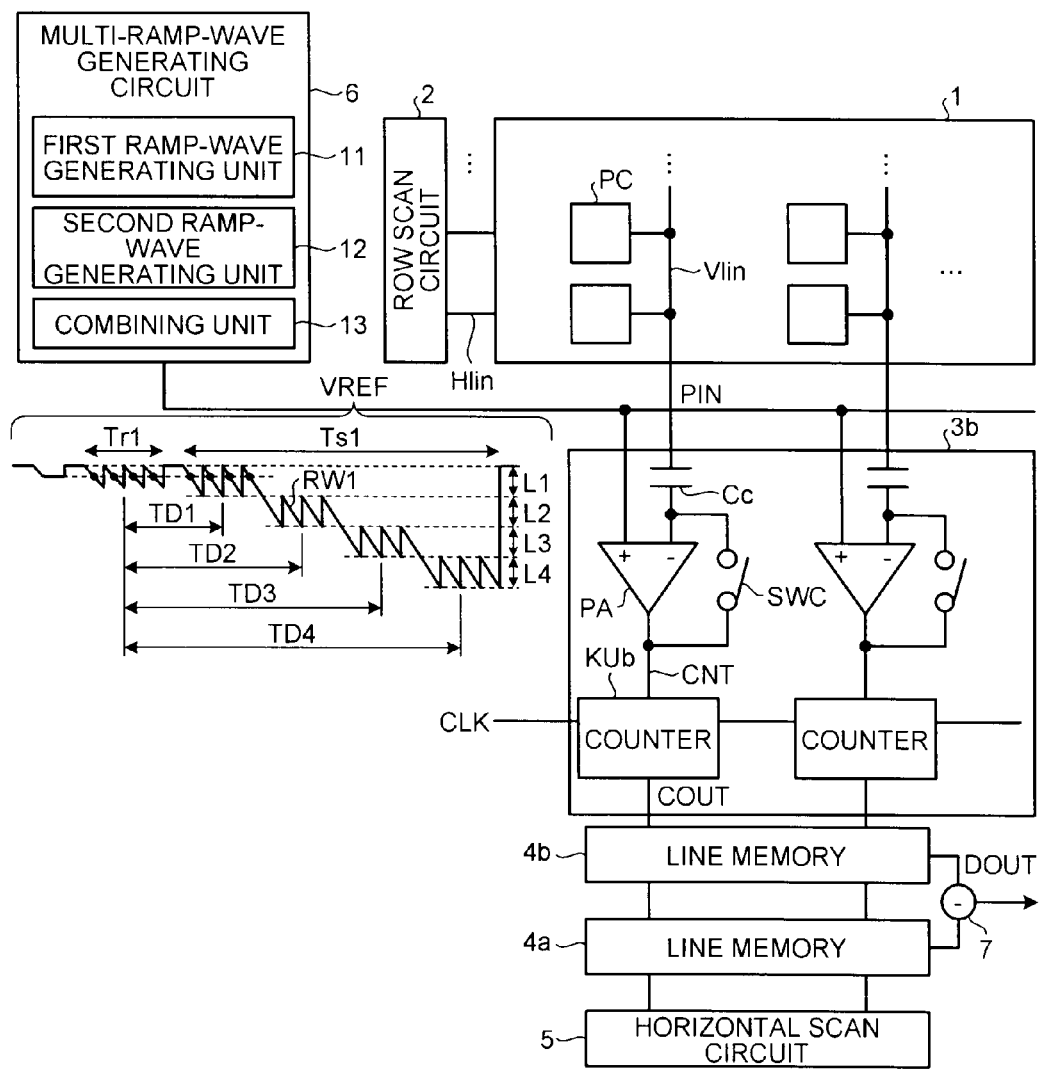
FIG. 9 is a block diagram illustrating the schematic configuration of a solid-state imaging device according to a fifth embodiment.

FIG. 9 is a block diagram illustrating the schematic configuration of a solid-state imaging device according to a fifth embodiment.

In FIG. 9, the solid-state imaging device includes a column ADC circuit 3b, line memories 4a and 4b, and a subtractor 7, instead of the column ADC circuit 3 and the line memory 4 of FIG. 1.

Here, the column ADC circuit 3b includes counters KUb, instead of the U/D counters KU of FIG. 1.

The counters KUb repeatedly perform an up-count operation until each of the reference levels multiply-sampled from signals of individual pixels PC reaches the level of the reference voltage VREF, so that the reference levels of the signals of the individual pixels PC are converted into digital values COUT, and the digital values of horizontal pixels are stored in the line memory 4a.

Further, the counters KUb repeatedly perform an up-count operation until each of the signal levels multiply-sampled from signals of individual pixels PC reaches the level of the reference voltage VREF, so that the signal levels of the signals of the individual pixels PC are converted into digital values COUT, and the digital values of the horizontal pixels are stored in the line memory 4b.

Next, the subtractor 7 obtains the differences between the signal levels of digital values COUT multiply-sampled and the reference levels of digital values COUT multiply-sampled so as to detect signal components of the individual pixels PC through the CDS.

Here, the line memories 4a and 4b are provided instead of the line memory 4. Therefore, even in a case where the counters KUb are provided instead of the U/D counters KUa of FIG. 1, it is possible to implement the CDS process.

(Sixth Embodiment)

Figure 10:
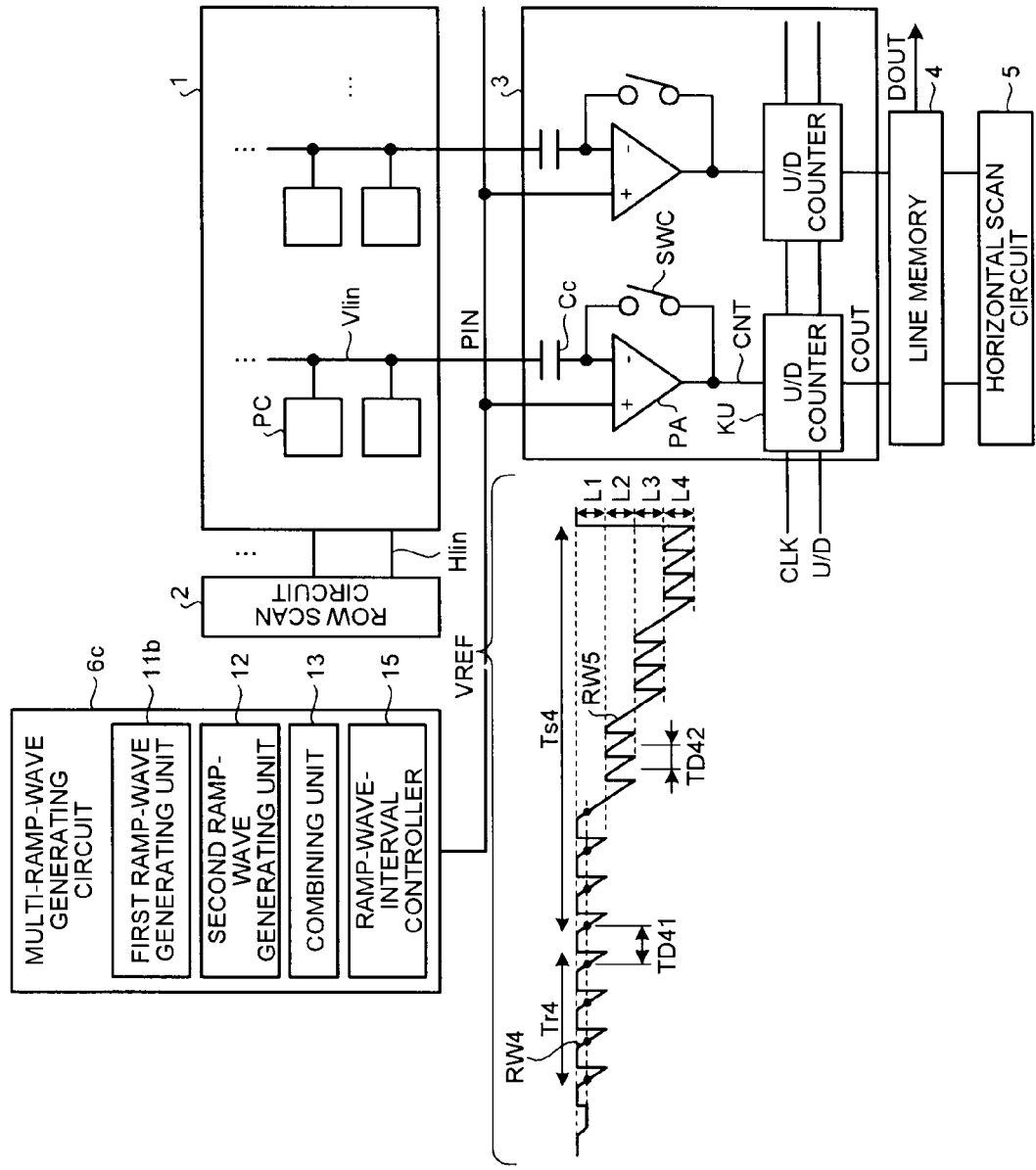
FIG. 10 is a block diagram illustrating the schematic configuration of a solid-state imaging device according to a sixth embodiment.

FIG. 10 is a block diagram illustrating the schematic configuration of a solid-state imaging device according to a sixth embodiment.

In FIG. 10, the solid-state imaging device includes a multi-ramp-wave generating circuit 6c, instead of the multi-ramp-wave generating circuit 6 of FIG. 1. The multi-ramp-wave generating circuit 6c is implemented by adding a ramp-wave-interval controller 15 to the multi-ramp-wave generating circuit 6.

The ramp-wave-interval controller 15 can adjust each of intervals of ramp waves RW4 used for sampling the reference level to be equal to a time period TD41 from the final sampling timing of the reference level to the first sampling timing of the signal level in the CDS.

Further, the ramp-wave-interval controller 15 can adjust each of the intervals of the ramp waves RW4 used for sampling the reference level for at least the level L1 in which the signal level is low, to be equal to the time period TD41 from the final sampling timing of the reference level to the first sampling timing of the signal level in the CDS.

Furthermore, the ramp-wave-interval controller 15 can adjust each of intervals of ramp waves RW5 used for sampling the reference level for each of the levels L2 to L4 in which the signal levels are high, to correspond to a time period TD42 which is half the time period TD41 from the final sampling timing of the reference level to the first sampling timing of the signal level in the CDS.

Next, the row scan circuit 2 scans the pixels PC in the vertical direction so as to select pixels PC, and signals read from the pixels are transmitted to the column ADC circuit 3a through the vertical signal line Vlin.

Meanwhile, in a reference level detection period Tr4, a plurality of ramp waves RW4 are generated in the time period TD41, and are sequentially input to the non-inversion input terminal of the comparator PA. Further, in a signal level detection period Ts4, for the level L1, the plurality of ramp waves RW4 are generated in the time period TD41 and are sequentially input to the non-inversion input terminal of the comparator PA. Furthermore, in the signal level detection period Ts4, for each of the levels L2 to L4, a plurality of ramp waves RW5 are generated at time intervals TD42 and are sequentially input to the non-inversion input terminal of the comparator PA.

Next, the column ADC circuit 3 multiply-samples the reference levels from the signals of the individual pixels PC, and at the same time, multiply-samples signal levels for each of the levels L1 to L4 according to the signal levels from the signals of the individual pixels PC. Then, the differences between the multiply-sampled signal levels and the multiply-sampled reference levels are obtained so as to detect signal components of the individual pixels PC through the CDS.

Here, each of the time intervals of the ramp waves RW4 used for sampling the reference level and the signal level for the level L1 are set to the time period TD41. Therefore, it is possible to effectively reduce the RTS noise of reference level and the signal level of the level L1 by multiple sampling.

Further, the time intervals of the ramp waves RW5 used for sampling the signal levels within the levels L2 to L4 are set to the time period TD 42. Therefore, it is possible to effectively reduce the RTS noise of the signal levels of the levels L2 to L4 by multiple sampling while suppressing the increase in a signal process time period.

Furthermore, in the example of FIG. 10, a method of setting the intervals of the ramp waves RW4 used for sampling the reference level and the signal level of the level L1 to the time period TD41 and setting the time intervals of the ramp waves RW5 used for sampling the signal levels of the levels L2 to L4 has been described. However, the time intervals of the ramp waves RW5 used for sampling the signal levels of the levels L2 to L4 may also be set to the time period TD41.

Figure 11:
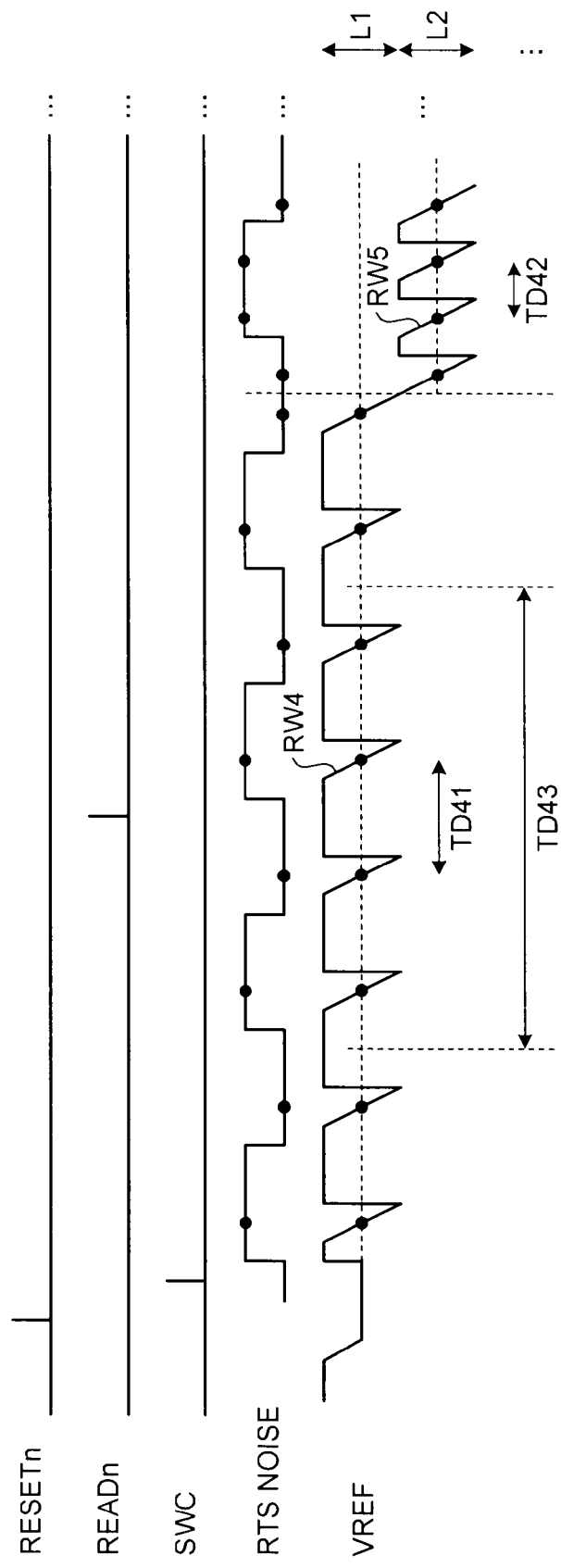
FIG. 11 is a timing chart illustrating the waveforms of respective units of the solid-state imaging device of FIG. 10.

FIG. 11 is a timing chart illustrating the waveforms of respective units of the solid-state imaging device of FIG. 10.

In FIG. 11, if the reset signal RESETn transitions to the high level in a state in which the row selection transistor Ta is in the ON state, the reset transistor Tc is turned on, so that the voltage according to the reference level of the floating diffusion FD is applied to the gate of the amplifying transistor Tb. Therefore, the voltage of the vertical signal line Vlin follows the voltage applied to the gate of the amplifying transistor Tb, and the voltage applied to the gate of the amplifying transistor Tb is output as the reference level of output voltage PIN to the vertical signal line Vlin.

Here, since a switch SWC is turned on when the reference level of the signal from the pixel PC is output, an input voltage of the non-inversion input terminal of the comparator PA is clamped by the output voltage, so that an operation point is set.

Next, after the switch SWC is turned off, in the reference level detection period Tr4, the reference level of output voltage PIN is input to the comparator PA through the capacitor Cc, and in this state, the ramp wave RW4 is repeatedly applied as the reference voltage VREF, so that the reference level of output voltage PIN and the reference voltage VREF are repeatedly compared with each other.

Then, in a case where the reference level of output voltage PIN is lower than the level of the reference voltage VREF, an output voltage CNT of the comparator PA has a high level. If the reference level of output voltage PIN for each ramp wave RW4 is equal to the level of the reference voltage VREF, the output voltage CNT has a low level. The length of the high level period is repeatedly down-counted by the U/D counter KU, so that the reference level of output voltage PIN multiply-sampled is converted into the digital value COUT, which is stored in the U/D counter KU.

Next, if the read signal READn transitions to the high level in a state in which the row selection transistor Ta of the pixel PCn is in the ON state, the read transistor Td is turned on, so that the electric charge accumulated in the photodiode PD is transmitted to the floating diffusion FD. Therefore, the voltage according to the signal level of the floating diffusion FD is applied to the gate of the amplifying transistor Tb and is output as the reference level of output voltage PIN to the vertical signal line Vlin.

Then, the signal level of output voltage PIN is input to the comparator PA through the capacitor Cc, and in this state, the ramp wave RW4 is repeatedly applied as the reference voltage VREF for the level L1 and then the ramp waves RW5 are repeatedly applied as the reference voltage VREF for each of the levels L2 to L4, such that the signal level of output voltage PIN and the reference voltage VREF are repeatedly compared with each other.

In a case where the signal level of output voltage PIN is lower than the level of the reference voltage VREF, the output voltage CNT of the comparator PA has the high level, and if the signal level of output voltage PIN is equal to the level of the reference voltage VREF for each of the ramp waves RW4 and RW5, the output voltage CNT has the low level. The length of the high level period is repeatedly up-counted this time by the U/D counter KU, so that the difference between the signal level of output voltage PIN multiply-sampled and the reference level of output voltage PIN is converted into a digital value COUT, and the digital values of horizontal pixels are stored in the line memory 4.

Therefore, it is possible to effectively reduce the RTS noise of the reference level and the signal level by multiple sampling while reducing random noise caused by the multiple sampling. The frequency capable of reducing the RTS noise can effectively reduce three kinds of fluctuations occurring in at least the CDS period TD41 and a time period TD43 which is two or four times the CDS period TD41.

Also, in the above-mentioned embodiment, for digital CDS processing, as a circuit for calculating the difference between the reference level signal and the signal level of the signal, use is made of an up/down counter and a circuit that holds the reference level and the signal level in separate line memories, respectively and calculates the difference between the output signals that are read out. Alternatively, a counter-type calculation process circuit using two complements may be provided to count the reference level signal by a U/D counter, inverting the counted value with a control signal for inverting the counted value, and then up-counting the signal level.

Further, the number of times of ramp wave generation in the first ramp-wave generating unit is reduced when a signal level at the second ramp-wave generating unit is high, which makes it possible to reduce the time for the AD conversion, and accordingly, to increase the operation speed.

Furthermore, it is possible to linearize a photoelectric conversion characteristic by further providing an amplifying circuit for amplifying digital signals resulting from the reduction in the number of times of ramp wave generation in the first ramp-wave generating unit.

FIG. 12A is a block diagram illustrating the schematic configuration of a multi-ramp-wave generating circuit, and FIG. 12B is a timing chart illustrating the waveforms of respective units of a solid-state imaging device of FIG. 12A.

In FIG. 12A, the multi-ramp-wave generating circuit generates ramp waves by using an operational amplifier 31.

The negative input terminal of the operational amplifier 31 is connected to a constant current source circuit Iramp1. The output of the operational amplifier 31 is connected to the negative input terminal through a switch SWramp1. Further, the output of the operational amplifier 31 is connected to the negative input terminal through a capacitor Cramp1. The switch SWramp1 controls the period Tra1 of a first ramp wave by an output pulse Pramp of a ramp-wave-interval control circuit 41. The inclination of the first ramp wave can be changed by the current amount of the constant current source circuit Iramp1 and the capacitance of the capacitor Cramp1. Therefore, the amplitude of the first ramp wave can be changed by controlling the current amount of the constant current source circuit Iramp1 by the first ramp-wave control circuit 42.

The positive input terminal of the operational amplifier 31 receives a predetermined voltage, for example, 1.5 V. This voltage is applied as a bias voltage generated by a constant current source circuit Iramp2, a resistor R1, and a resistor R2. The voltage of 1.5 V which is same as the input voltage is output as an output VREF of the operational amplifier 31. At this time, if the switch SWramp1 is turned on, the voltage of the negative input terminal is also 1.5 V. If the switch SWramp1 is turned off, the current generated by the constant current source circuit Iramp1 flows into the capacitor Cramp1. Since the positive and negative input terminals of the operational amplifier 31 hold the same voltage, the output voltage varies. Since the constant current source circuit Iramp1 inputs a constant current, the output generates the first ramp wave having a constant inclination.

As illustrated in FIG. 12B, at the timing t4, the value of the resistor R1 is greatly changed by the second ramp-wave control circuit 43. Then, the bias voltage of a second ramp wave Vramp2 varies. Similarly, it is possible to generate the second ramp wave Vramp2 that changes stepwise in voltage level by further greatly changing the value of the resistor R1 by the second ramp-wave control circuit 43. Further, like the timings t1, t2, and t3, it is possible to change the second ramp wave stepwise by a little by changing the value of the resistor R2 by a little by the sweep-starting-point control circuit 44. With the output of the operational amplifier 31, it is possible to generate a ramp wave VREF by combining the second ramp wave VRamp2 and the first ramp wave VRamp1.

The second ramp-wave control circuit 43 and the sweep-starting-point control circuit 44 perform control synchronized with the ramp-wave-interval control circuit 41.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
a pixel outputting a photoelectrically converted signal;
an ADC circuit disposed in an edge portion of a pixel area to convert an analog signal of the pixel into a digital signal based on a result of comparison between a signal level output from the pixel and a ramp wave which is a reference voltage; and
a multi-ramp-wave generating circuit generating a plurality of ramp waves with different amplitudes and combining the ramp waves to obtain the ramp wave, wherein
the multi-ramp-wave generating circuit includes:
a first ramp-wave generating unit generating a first ramp wave with a small amplitude; and
a second ramp-wave generating unit generating a second ramp wave with an amplitude larger than an amplitude of the first ramp wave in a stepwise fashion.

2. The solid-state imaging device according to claim 1,
wherein the multi-ramp-wave generating circuit includes:
a first ramp-wave control unit configured to control a slope of the first ramp wave; and
a second ramp-wave control unit configured to control an amplitude of a step of the second ramp wave.

3. The solid-state imaging device according to claim 1,
wherein the multi-ramp-wave generating circuit further includes a ramp-wave-interval adjusting unit configured to generate a plurality of ramp waves for use in taking in a reference level with no signal to be taken in with a unit ramp wave a plurality of times in a period equivalent to a minimum interval between a taking-in timing of the reference level and a taking-in timing of the signal level.

4. The solid-state imaging device according to claim 1, wherein the multi-ramp-wave generating circuit further includes a ramp-wave-interval adjusting unit configured to generate a plurality of ramp waves for use in taking in at least at a minimum signal level of a stepwise ramp wave a plurality of times in a period equivalent to a minimum interval between a taking-in timing of a reference level with no signal to be taken in with a unit ramp wave and a taking-in timing of the signal level.

5. The solid-state imaging device according to claim 1, wherein the ADC circuit includes:
a comparator circuit converting an analog signal to a digital signal; and
a counter circuit counting a length of a comparator output until the comparator output changes.

6. The solid-state imaging device according to claim 2, wherein the multi-ramp-wave generating circuit includes:
the first ramp-wave control unit generating the first ramp waves over a plurality of times in a first level period of each step of the second ramp wave; and
a combining circuit combining the first ramp wave with the second ramp wave.

7. The solid-state imaging device according to claim 6, wherein the multi-ramp-wave generating circuit further includes a sweep-starting-point controller controlling a level of each sweep starting point of the first ramp waves generated over the plurality of times by the ramp wave produced through combining by the combining circuit.

8. The solid-state imaging device according to claim 2, wherein the second ramp-wave generating unit further includes the second ramp-wave control unit performing control such that a step of a ramp wave sequentially increases in the same direction as an increasing direction of an output signal of the pixel.

9. The solid-state imaging device according to claim 2, wherein the first ramp-wave generating unit includes the first ramp-wave control unit controlling a ramp wave such that an acclivity and a declivity are substantially equal in slope.

10. The solid-state imaging device according to claim 2, wherein the multi-ramp-wave generating circuit further includes the first ramp-wave control unit that reduces the number of times of generation performed by the first ramp-wave generating unit when a step level of the second ramp wave is high.

11. The solid-state imaging device according to claim 10, further comprising:
a gain control unit controlling a gain of an amplifying circuit that amplifies digital data in reverse proportion to the number of times of generation of the first ramp wave generated in each step of the second ramp wave.

12. The solid-state imaging device according to claim 5, wherein the ADC circuit further includes a counter control unit controlling the counter circuit that receives a photoelectrically converted signal level when receiving a reference level having no signal output from the pixel.

13. The solid-state imaging device according to claim 5, wherein the ADC circuit includes:
a first line memory storing the reference level, and
a second line memory storing the signal level.

14. A solid-state imaging device comprising:
a pixel outputting a photoelectrically converted signal;
a column ADC circuit performing conversion to a digital signal based on a result of comparison between a reference level and a signal level varying according to the signal output from the pixel; and
a reference voltage generating circuit generating a large ramp wave in which the reference voltage is varied in a stepwise fashion and a plurality of small ramp waves for each step and sequentially outputting them to the column ADC circuit for every step when the signal level and the reference voltage are compared to each other, wherein
the reference voltage generating circuit includes:
a first ramp-wave generating unit generating a large ramp wave that varies the reference voltage in a stepwise fashion; and
a second ramp-wave generating unit generating a plurality of small ramp waves that are varied in a stepwise fashion in each step; and
a sweep-starting-point controller shifting a start level of each of the ramp waves generated in the second ramp-wave generating unit.

15. The solid-state imaging device according to claim 14, wherein the second ramp-wave generating unit has an acclivity and a declivity, and
the column ADC circuit samples the signal level on both sides of the acclivity and the declivity.

16. The solid-state imaging device according to claim 14, wherein the second ramp-wave generating unit sets the number of steps of the second ramp wave such that a resolution capability of AD conversion of the column ADC circuit is coarser than an upper limit thereof.

17. A solid-state imaging device comprising:
a pixel outputting a photoelectrically converted signal;
a column ADC circuit performing conversion to a digital signal based on a result of comparison between a reference level and a signal level varying according to the signal output from the pixel; and
a reference voltage generating circuit generating a large ramp wave in which the reference voltage is varied in a stepwise fashion and a plurality of small ramp waves for each step and sequentially outputting them to the column ADC circuit for every step when the signal level and the reference voltage are compared to each other, wherein
the reference voltage generating circuit includes a ramp-wave-interval adjusting unit adjusting an interval between ramp waves for use in sampling a reference level to be consistent with a time interval from a last sampling timing of the reference level with no signal to a first sampling timing of the signal level.

18. The solid-state imaging device according to claim 17, wherein the reference voltage generating circuit includes a ramp-wave-interval adjusting unit adjusting an interval between ramp waves in at least a step in which the signal level is low, to be consistent with a time interval from a last sampling timing of the reference level with no signal to a first sampling timing of the signal level.

* * * * *